United States Patent [19]
Jensen

[11] 3,750,918
[45] Aug. 7, 1973

[54] FISHING ROD HOLDER
[76] Inventor: Arthur B. Jensen, R. R. 1, Box 232A, Moline, Ill. 61265
[22] Filed: Aug. 25, 1971
[21] Appl. No.: 174,776

[52] U.S. Cl. .................................. 224/5 E, 43/21.2
[51] Int. Cl. ............................................. A45c 1/04
[58] Field of Search ..................... 224/5.3, 5.6, 5.11; 43/21.2; 248/291, 284

[56] References Cited
UNITED STATES PATENTS

| | | | |
|---|---|---|---|
| 2,314,747 | 3/1943 | White | 224/5 E X |
| 1,918,389 | 7/1933 | Gerline | 224/5 E X |
| 1,877,845 | 9/1932 | Gerline | 248/291 |
| 481,408 | 8/1892 | Manley | 248/291 X |
| 1,174,319 | 3/1916 | Hipwood | 224/5 E |
| 368,367 | 8/1887 | Aiken | 248/291 X |

Primary Examiner—Gerald M. Forlenza
Assistant Examiner—Lawrence J. Oresky
Attorney—John O. Hayes

[57] ABSTRACT

A body-mounted fishing rod holder including a support member adapted to be held against the abdomen of the user by a belt or a strap encircling the body, and a rod holder structure mounted on the support member for vertical pivotal movement about a transverse axis, the rod holder structure including a spring-biased latch mechanism cooperable with a plurality of ratchet teeth on the support member to hold the structure in any one of a series of angularly spaced positions. The ratchet teeth permit the holder structure to be raised from one position to another by merely exerting an upward force thereon, but necessitate a manual release of the latch mechanism to lower the structure between positions. The support member is composed in part of a pair of parallel plates extending forwardly on opposite sides of the rod holder structure and having the ratchet teeth formed in their leading edges, the plates serving as guide members facilitating quick and easy insertion of the rod on the rod holder structure.

15 Claims, 7 Drawing Figures

PATENTED AUG 7 1973 3,750,918

INVENTOR.
ARTHUR B. JENSEN

*INVENTOR.*
ARTHUR B. JENSEN

FISHING ROD HOLDER

BACKGROUND OF THE INVENTION

The present invention relates generally to fishing rod holding devices and more particularly to such devices adapted to be mounted on the body of the user and particularly suited for use by individuals having only one arm.

Devices for supporting a fishing rod on a dock, the side of a boat, or other structure are well known in the art and generally consist of a clamp mechanism adapted for releasable securement to the supporting structure, and a rod-holding element often adjustably connected to the clamp mechanism and including means for supporting a fishing rod. Illustrative of devices of this general type are those disclosed in U.S. Pat. Nos. 2,704,412 to Davis and 3,139,252 to Mann. Although such rod-holding devices may be used to some advantage by a one-armed angler, they are generally not designed for this purpose and are consequently less than adequate for such use. For example, such prior art devices do not include provision for mounting the rod in convenient, close proximity to the body of the user, nor do they include provision for quickly and easily inserting and removing the rod or for moving the rod about as required to "play" a lure or to land a fish.

Certain of these shortcomings of conventional fishing rod holders may be overcome by mounting the rod-holding element on the body of the user, thereby positioning the rod in convenient proximity to the body and permitting limited movement of the rod in response to movement of the body. A device of this general type is disclosed in U.S. Pat. Nos. 2,598,021 to Schwanke. The Schwanke device and others of the same general type are still not entirely satisfactory, however, since they require excessive body movement when working a lure or landing a fish. In addition, it is desirable to include means facilitating rapid and easy insertion of the rod in the holder. When casting and retrieving a lure in weedy areas, for example, it is necessary to begin retrieval of the lure immediately following the cast.

SUMMARY OF THE INVENTION

Accordingly, it is a primary object of the present invention to provide a fishing rod holder suitable for use by a one-armed fisherman and more particularly such a device adapted to be mounted on the body of the user and having means for quickly and easily adjusting the position of the rod relative to the body. It is another object to provide such a holding device having means facilitating quick and easy insertion of the rod on the device. It is yet another object to provide such a device having means for securely holding the rod in proper position. It is a still further object to provide such a device having a simple, light-weight, and economical construction.

The invention comprises, generally, a support member adapted to be held against the abdomen of the user by a belt encircling the waist, and a rod holder structure mounted on the support for vertical pivotal movement about an axis transverse to the body of the user. A manually operable, spring-biased latch mechanism mounted on the rod holder structure is engageable with a series of ratchet teeth on the support to lock in any of a plurality of angularly spaced positions relative to the support member. The ratchet teeth permit the holder to be raised between positions by merely exerting an upward force thereon, since the ratchet teeth act as cam surfaces in the upward direction against the latch mechanism. To lower the rod between positions, however, the latch must be manually held out of engagement with the teeth.

Such adjustment of the rod position relative to the body permits the rod to be held with the top thereof close to the surface of the water, which may be desirable when working a lure, for example, and at the same time permits the rod to be quickly raised to a substantially vertical position, which is necessary when landing a large fish. In addition, the pivotal mounting of the rod holder structure, when the latch mechanism is held out of engagement with the support, permits the rod to be jerked or whipped for working a lure without moving the body.

The support member of the invention includes a pair of vertical, forwardly extending parallel plates on opposite sides of the rod holder structure, the ratchet teeth being formed along the outer edges thereof, and the holder structure being mounted on a pin extending transversely therebetween. A pair of stop members, for limiting the upper and lower extent of movement of the rod relative to the support, also extend transversely between the plate members. The plates further serve as guide members for inserting the rod on the rod holder structure.

BRIEF DESCRIPTION OF THE DRAWINGS

The preferred embodiment of the present invention will be described in conjunction with the accompanying drawings in which.

DESCTIPTION OF THE PREFERRED EMBODIMENT

Figure 1:
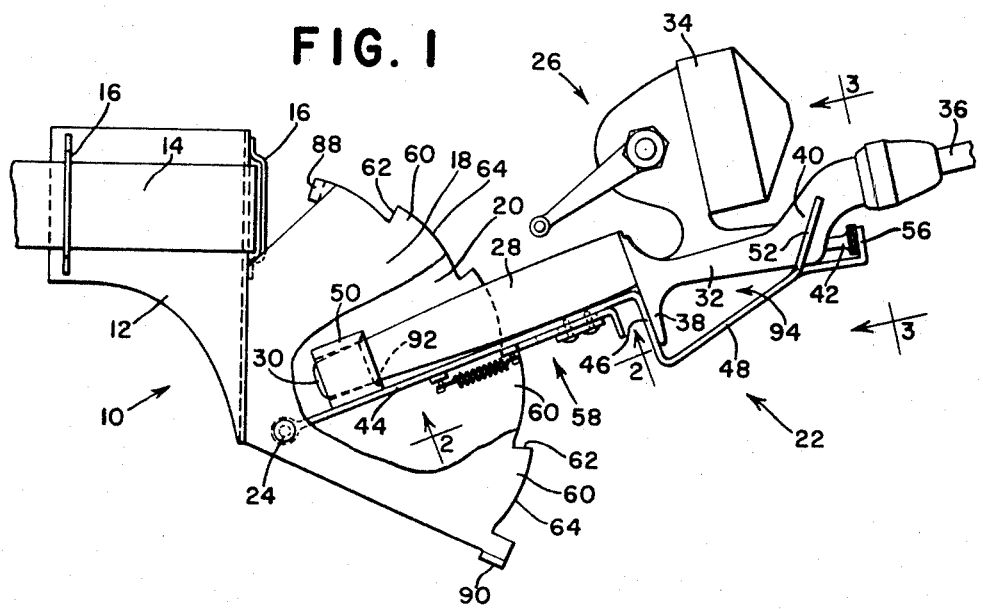
FIG. 1 is a side view of the fishing rod holder of the invention, with portions broken away for the sake of clarity.
Figure 4:
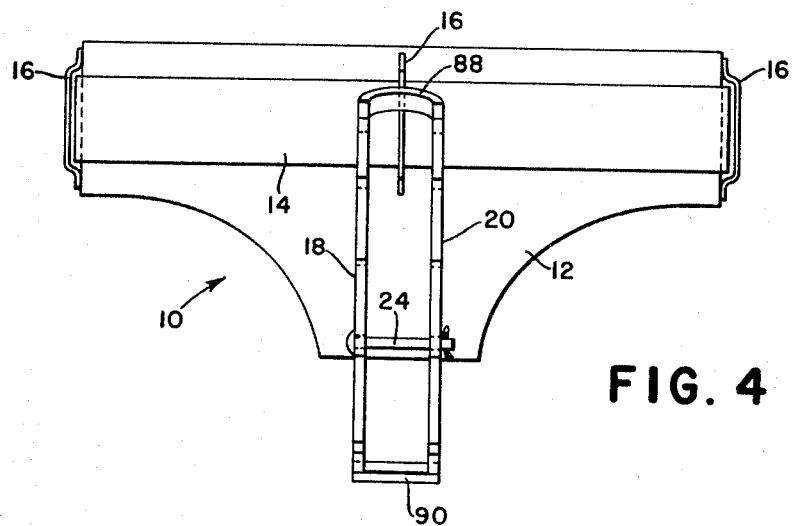
FIG. 4 is a front view of the invention with the rod holder structure removed therefrom.

Referring first to FIGS. 1 and 4 of the drawings, the fishing rod holder of the present invention comprises a support structure indicated generally by the numeral 10 and including a curved plate member 12 adapted to fit against the adbomen of the user. A strap or belt 14 (only partially shown in the drawings) extends through a plurality of loops 16 fixed to the member 12 and may be tightened around the body by means of a conventional buckle or other fastening device to securely hold the member 12 against the abdomen. The support further comprises a pair of transversely spaced, parallel plates 18 and 20 mounted on the member 12 and extending forwardly therefrom, the plates being fixed along their vertical rear edges, as by welding, to the central portion of the member 12.

A rod holder structure, designated generally by the numeral 22 in FIG. 1, is pivotally mounted on a transverse pin 24 extending between the plates 18 and 20 and is adapted to releasably hold a fishing rod 26. The structure 22 is swingable vertically about the pin 24 and includes means thereon (to be hereinafter described) cooperable with the support to hold the rod in a plurality of angularly spaced positions relative thereto. The rod 26 is of a conventional "bait casting" type and includes an elongated, generally cylindrical handle 28 having a rounded inner end 30, a reel-holding portion 32 connected to the outer end of the handle 28 and adapted to hold a conventional reel 34, and a rod shown partially at 36. The reel-holding portion 32 includes a conventional grip member 38 projecting downwardly from its rearward end, an upwardly and forwardly extending portion 40 at its forward end, and a reel retaining screw 42 extending forwardly from its forward end.

Figure 3:
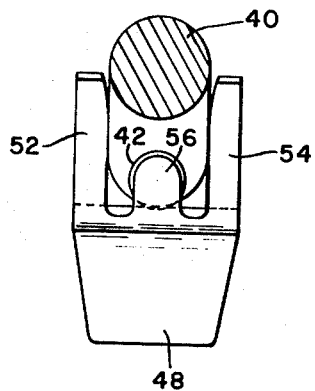
FIG. 3 is an enlarged view taken along the line 3—3 of FIG. 1.

The rod holder structure 22 is formed from a flat strip and includes a first portion 44 pivotally mounted at its rearward end on the pin 24 and extending radially outwardly therefrom, a second portion 46 depending downwardly from the outer end of the portion 44, and a third portion 48 extending upwardly and forwardly from the portion 46. When positioned on the structure 22, the rounded end 30 of the rod handle 28 fits snugly within a cylindrical socket member 50 fixed to the inner end of the portion 44, the handle 28 lies along the upper surface of the portion 44, and the backside of the grip member 38 engages the front surface of the portion 46. AS shown in FIGS. 1 and 3, the forward end of the reel-holding portion 32 rests against the upper end of the portion 48, a pair of transversely spaced, parallel members 52 and 54 integral with the portion 48 extend upwardly and forwardly along opposite sides of the reel-holding portion 32, and a hook member 56 extends forwardly from the portion 48 and upwardly in front of and in engagement with the reel retaining screw 42. In operation, the socket member 50, the portion 46, and the hook member 52 thus serve to retain the rod 26 in proper fore-and-aft position, while the members 52 and 54 prevent the rod from rotating about its longitudinal axis.

For the purpose of releasably retaining the rod holder structure 22 in a plurality of angularly spaced positions relative to the support 10, a latch mechanism designated generally by the numeral 58 is provided on the lower surface of the portion 44 (see FIG. 2), the latch being cooperable with a plurality of transversely aligned recesses defined by ratchet teeth 60 formed along the outer edges of the plates 18 and 20. The ratchet teeth 60 are formed along an imaginary arc swung about the axis of the pivot pin 24, such that each latch-receiving recess is at an equal distance therefrom. Each tooth 60 includes a first edge portion 62 extending generally radially outwardly from the pin 24 and operative to engage the latch mechanism 58 on the rod holder structure, and a second edge portion 64 extending downwardly from the outer end of the first portion along a smooth arc having a decreasing radius about the axis of pin 24. The lower end of the second edge portion 64 joins the inner end of the first edge portion 62 of the adjacent lower ratchet tooth 60.

Figure 2:
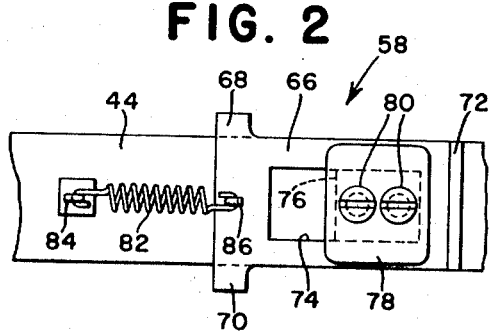
FIG. 2 is an enlarged view taken along the line 2—2 of FIG. 1.

The latch mechanism 58 on the rod holder structure, referring now to FIGS. 1 and 2, comprises a member 66 slidably mounted on the portion 44 and including a pair of transverse projections 68 and 70 engageable with the ratchet tooth portion 62 on the support to retain the rod in the desired position, and a downturned forward end 72. The slidable mounting of the member 66 is accomplished by means of an elongated slot 74 formed therein, a spacer member 76 received by the slot 74 and having a width generally corresponding thereto, and a cover plate 78 overlying the member 66, the spacer 76 and cover plate 78 being mounted on the portion 44 by means of two screws 80. A coil spring 82 acts between a pair of hooks 84 and 86 on the portion 44 and member 66, respectively, to bias the member 66 radially inwardly, and to thereby bias the projections 68 and 70 against the outer edges of the plates 18 and 20. As a consequence of the structure described, the rod holder 22 can be raised from one position to another by merely exerting an upward force thereon, since the edge portion 64 of the ratchet teeth 60 act as cam surfaces to urge the latch member 66 outwardly against the biasing force of the spring 82. However, to move the rod to a lower position, the projections 68 and 70 must be disengaged from the teeth 60 by pulling outwardly on the member 66. The downturned portion 72 of the member 66 is provided for manualy disengaging the projections from the recesses defined by the teeth 60.

A pair of stop members 88 and 90 extend transversely between the upper and lower portions of the plates 18 and 20 and are engageable, respectively, with the rod handle 28 and portion 44 to limit the upper and lower extremes of movement of the rod.

A significant feature of the invention resides in the manner in which the support 10 and rod holder structure 22 cooperate to permit fast and easy placement of the rod 26 in the structure 22. When positioning the rod on the structure 22, the end 30 of the handle 28 is first placed in the socket 50, and the reel-holding portion 32 is then inserted in place. The socket member 50 is thus used as a reference for properly positioning the rod on the structure 22, and it is therefore desirable to provide means for quickly and easily positioning the handle end portion 30 in the socket 50. For this purpose, the opposite edges of the portion 44 of the rod holder structure 22 lie closely adjacent to the sides of the plates 18 and 20, the diameter of the socket member 50 is substantially equal to the distance between the plates, and the bore of the socket is beveled as shown at 92. The plates 18 and 20 and portion 44 thus serve as guides for inserting the handle 28 in the socket 50. Further facilitating the insertion, as well as removal, of the rod 26 on the rod holder structure 22 is the configuration of the portion 48 of the structure 22, which defines a space 94 beneath the reel-holding portion 32 of the rod 26 for manually gripping the latter.

The operation of the embodiment shown in FIG. 1 will now be described. To change the bait or lure on the line, the rod is advantageously held by the support 10 in its fully raised position, so that the outer end of the rod is at a minimum distance from the body of the user. To ready the holder for casting, the latch mechanism 58 is pulled forwardly and the holder structure lowered to the position shown in FIG. 1. The rod is then gripped by inserting one or more fingers through the space 94 beneath the reel-holding portion 32 and lifted upwardly and pulled forwardly from the holder structure. Following the cast, the rod handle is inserted between the plates 18 and 20, the plates and portion 44 serving as guides for inserting the handle end portion 30 in the socket 50, an the reel-holding portion is then lowered into place. When it is desired to run the lure as deep as possible, the rod may be lowered to its lowest position by manually disengaging the latch mechanism 58 as previously described. When landing a fish, the rod may be raised to its extreme upper position by merely exerting an upward force thereon.

Figure 5:
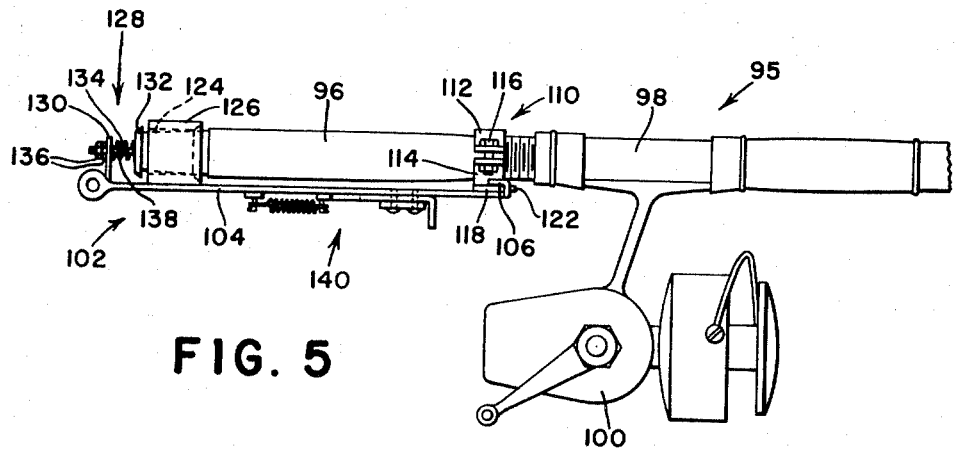
FIG. 5 is a side view of a modified rod holder structure.
Figure 6:
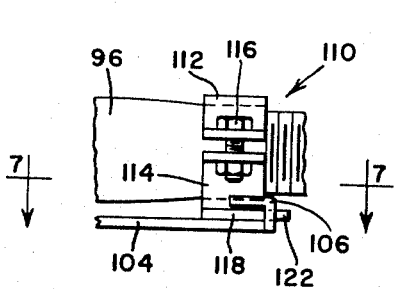
FIG. 6 is an enlarged, fragmentary side view of the rod holder structure shown in FIG. 5; and, FIG. 7 is a sectional view taken along the line 7—7 of FIG. 6.
Figure 7:
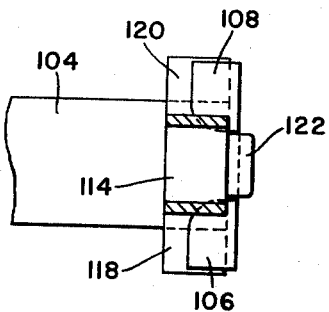

Reference is now made to FIGS. 5–7 of the drawings which illustrate another embodiment of the invention, this embodiment being particularly suited for use with a conventional rod 95 of the "spinning " type. The rod shown in FIG. 5 inlcudes an elongated, generally cylindrical handle portion 96, a reel-holding portion 98, and a conventional reel 100. A rod holder structure, designated generally by the numeral 102, is interchangeable on the support 10 with the rod holder structure 22, the structure 102 comprising an elongated plate member 104 adapted at its rearward end of pivotal mounting on the pin 24 and having a pair of transversely spaced upwardly and rearwardly extending retaining members 106 and 108 fixed to its forward end. A complementary retaining structure 110 is releasably mounted on the forward end of the rod handle 96 and includes upper and lower U-shaped clamp members 112 and 114 securely held on the handle 96 by means of two bolts 116. The lower clamp member 114 has a pair of transversely outwardly extending members 118 and 120 and a forwardly extending member 122 fixed thereto, the members 118 and 120 being receivable beneath the retaining members 106 and 108 on the rod holder structure 102, and the member 122 being receivable between said retaining members.

The rearward end portion 124 of the handle 96 is loosely received within a socket 126 mounted on the plate member 104. A biasing mechanism, designated generally by the numeral 128, is operative to urge the retaining structure 110 on the handle 96 into engagement with the retaining members 106 and 108 on the member 104. The mechanism 128 includes an upstanding bracket 130 on the member 104, a circular plate 132 adapted to engage the end of the handle 96, a threaded rod 134 fixed to the center of the plate 132 and extending rearwardly through an aperture in the bracket 130, a pair of retaining nuts 136 on the end of the rod 134, and a coil spring 138 acting between the bracket 130 and plate 132 to bias the latter forwardly.

When the rod 95 is positioned on the rod holder structure 102 as shown in FIG. 5, the member 122 of the retaining structure 110, in conjunction with the socket member 126, is operative to retain the rod in proper fore-and-aft alignment with the holder structure, while the members 118 and 120, again in conjunction with the socket member 126, are operative to retain the rod on the holder structure as well as to prevent the rod from rotating about its longitudinal axis.

The rod 95 is positioned on the holder 102 by first inserting the handle portion 124 in the socket 126 and against the plate member 132, then pulling back on the rod to compress the spring 138, and inserting the members 118 and 120 beneath the retaining members 106 and 108. To remove the rod from the structure, the spring 138 must again be compressed by pulling the rod rearwardly until the members 118 and 120 clear the retaining members 106 and 108. When inserting the handle portion 124 in the socket 126, the plates 18 and 20 and member 104 act as guides in a manner previously described with reference to the embodiment shown in FIG. 1.

A latch mechanism 140, identical in construction with the mechanism 58 on the rod holder 22 shown in FIGS. 1 and 2, is mounted on the lower side of the plate member 104 and is cooperable with the ratchet teeth 60 on the plates 18 and 20 to retain the member 104 in a plurality of angularly spaced positions relative to the support 10. The operation of the latch mechanism 140 is the same as that already described with reference to that of the latch mechanism 58 on the rod holder 22.

I claim:

1. A body supported fishing rod holder comprising: a support adapted to be releasably mounted on the body of the user; and rod holder structure mounted on said support for holding a rod having a generally cylindrical handle portion, a reel-holding portion extending forwardly from the handle portion, said reel-holding portion including a downwardly projecting grip member at its rearward end, and upwardly and forwardly extending portion at its forward end, and a reel-retaining screw extending forwardly from its forward end, said rod holder structure including a first portion adapted to extend forwardly beneath the handle portion, a socket member on the first portion adapted to receive the end of the handle portion, a second portion extending downwardly from the outer end of the first portion and engageable by the rear side of the grip member, a third portion extending upwardly and forwardly from the lower end of the second portion and engageable by the lower surface of the reel-holding portion at its forward end, an upwardly extending hook member on the forward end of the third portion engageable by the front side of the reel-retaining screw, and a pair of tranversely spaced members extending upwardly and forwardly from the forward end of the third portion and engageable by opposite sides of the upwardly and forwardly extending portion of the reel-holding portion of the rod.

2. The invention defined in claim 1 including transverse pivot means on the support, the rod holder structure being mounted at one end on the pivot means and extending generally forwardly therefrom, said structure being swingable vertically about the pivot means; and means for retaining the rod holder structure in a plurality of angularly spaced positions relative to the support including a plurality of latch-receiving recesses formed in the support generally along an imaginary arc swung about the transverse pivot means, and manually releasable latch means mounted on the rod holder structure and biased to engage said latch-receiving recesses.

3. The invention defined in claim 2 wherein said support comprises a pair of generally parallel, transversely spaced plate members on opposite sides of said rod structure and having transversely aligned pairs of latch-receving recesses formed therein, and wherein said latch means comprises a pair of transversely spaced elements engageable with said aligned pairs of latch-receiving recesses.

4. The invention defined in claim 2 wherein said means for retaining said rod holder structure in a plurality of angularly spaced positions relative to said support includes a plurality of ratchet teeth formed in said support generally along an imaginary arc swung about said transverse pivot means and defining said latch-receiving recesses; and manually releasable latch means mounted on said rod holder structure and biased generally radially inwardly relative to said pivot means to engage said ratchet teeth, said latch means being cooperable with said ratchet teeth to permit generally free upward movement of said rod holder structure relative to said support and to prevent downward movement of said rod holder structure without manual release of said latch means.

5. The invention defined in claim 4 wherein each of said ratchet teeth includes a first portion extending generally radially outwardly from said pivot means, and a second portion extending downwardly from the radial outer end of said first portion along a smooth arc having a decreasing radius about said pivot means, to the radial inner end of the first portion of the adjacent lower ratchet tooth.

6. The invention defined in claim 1 including upper and lower stop means on said support to limit the movement of said rod holder structure relative to said support.

7. The invention defined in claim 6 wherein said support comprises a pair of generally parallel, transversely spaced vertical wall portions on opposite sides of said rod holder structure, wherein said transverse pivot means comprises pin means extending between said wall portions and wherein said upper and lower stop means comprises transverse members interconnecting said wall portions.

8. A body supported fishing rod holder comprising: a support adapted to be releasably mounted on the body of the user, said support comprising a pair of generally parallel, transversely spaced planar wall portions having forward edges; transverse pivot means on said support; rod holder structure mounted at one end on said pivot means and extending generally forwardly therefrom between said wall portions, said structure being swingable vertically about said pivot means; a socket mounted on said rod holder structure between said wall portions and spaced inwardly from the forward edges of the wall portions for receiving the end of a fishing rod, said rod holder structure including a portion forwardly of said socket extending transversely between said wall portions, said wall portions and said rod holder structure portion serving as guides for inserting the fishing rod in said socket; and means for retaining said rod holder structure in a plurality of angularly spaced positions relative to said support including a plurality of ratchet teeth formed in the forward edges of the wall portions generally along an imaginary arc swung about the axis of said pivot means; and manually releasable latch means mounted on said rod holder structure and biased generally radially inwardly relative to said pivot means to engage said ratchet teeth, said latch means being cooperable with said ratchet teeth to permit generally free upward movement of said rod holder structure relative to said support and to prevent downward movement of said rod holder structure without manual release of said latch means.

9. The invention defined in claim 8 wherein the rod holder structure is adapted to hold a rod having a generally cylindrical handle portion, a reel-holding portion extending forwardly from the handle portion, said reel-holding portion including a downwardly projecting grip member at its rearward end, an upwardly and forwardly extending portion at its forward end, and a reel-retaining screw extending forwardly from its forward end, the socket on the rod holder structure being adapted to receive the end of the rod handle portion, said rod holder structure comprising a first portion adapted to extend forwardly beneath the handle portion, a second portion extending downwardly from the outer end of the first portion and engageable by the rear side of the grip member on the rod, a third portion extending upwardly and forwardly from the lower end of the second portion and engageable by the lower surface of the reel-holding portion at its forward end, an upwardly extending hook member on the forward end of the third portion engageable by the front side of the reel-retaining screw, and a pair of transversely spaced members extending upwardly and forwardly from the forward end of the third portion and engageable by opposite sides of the upwardly and forwardly extending portion of the reel-holding portion of the rod.

10. The invention defined in claim 9 wherein the third portion of the rod holder structure is adapted to extend below the reel-holding portion of the rod in spaced relation therewith to provide a space for manually gripping the rod.

11. The invention defined in claim 8 including upper and lower stop members extending transversely between the wall portions of the support to limit the vertical swinging movement of the rod holder structure relative to the support.

12. The invention defined in claim 8 wherein the transverse pivot means comprises a pin extending transversely between the wall portions of the support.

13. The invention defined in claim 1 wherein the third portion of the rod holder structure is adapted to extend below the reel-holding portion of the rod in spaced relation therewith to provide a space for manually gripping the rod.

14. The invention defined in claim 1 wherein the support comprises a pair of generally parallel, transversely spaced planar wall portions disposed on opposite sides of the rod holder structure and extending forwardly from the socket member on said structure the wall portions serving as guides for inserting the end of the rod handle portion into the socket member.

15. The invention defined in claim 14 wherein the first portion of the rod holder structure extends transversely between the wall portions and serves as a guide for inserting the end of the rod handle portion into the socket member.

* * * * *